United States Patent
Kumagai et al.

(10) Patent No.: US 12,312,433 B2
(45) Date of Patent: May 27, 2025

(54) CHLOROPRENE-BASED BLOCK COPOLYMER, LATEX, LATEX COMPOSITION, AND RUBBER COMPOSITION

(71) Applicant: DENKA COMPANY LIMITED, Tokyo (JP)

(72) Inventors: Yushi Kumagai, Tokyo (JP); Wataru Nishino, Tokyo (JP); Yutaka Saito, Tokyo (JP); Naoki Kobayashi, Tokyo (JP)

(73) Assignee: DENKA COMPANY LIMITED, Tokyo (JP)

( * ) Notice: Subject to any disclaimer, the term of this patent is extended or adjusted under 35 U.S.C. 154(b) by 580 days.

(21) Appl. No.: 17/788,958

(22) PCT Filed: Mar. 22, 2021

(86) PCT No.: PCT/JP2021/011776
§ 371 (c)(1),
(2) Date: Jun. 24, 2022

(87) PCT Pub. No.: WO2021/193560
PCT Pub. Date: Sep. 30, 2021

(65) Prior Publication Data
US 2023/0055361 A1    Feb. 23, 2023

(30) Foreign Application Priority Data
Mar. 26, 2020  (JP) ................ 2020-056386

(51) Int. Cl.
*C08F 293/00* (2006.01)
*C08K 5/01* (2006.01)

(52) U.S. Cl.
CPC ........... *C08F 293/00* (2013.01); *C08K 5/01* (2013.01); *C08K 2201/019* (2013.01)

(58) Field of Classification Search
CPC ................. C08F 293/00; C08K 5/01
USPC ........................................ 524/458
See application file for complete search history.

(56) References Cited

U.S. PATENT DOCUMENTS

| | | |
|---|---|---|
| 5,089,601 A | 2/1992 | Ozoe et al. |
| 2004/0106732 A1 | 6/2004 | Tsuji et al. |
| 2009/0036608 A1* | 2/2009 | Ozoe ............. C09J 113/02 525/215 |
| 2019/0389994 A1 | 12/2019 | Nishino et al. |
| 2020/0207900 A1 | 7/2020 | Ishigaki et al. |
| 2021/0292525 A1 | 9/2021 | Onozuka et al. |

FOREIGN PATENT DOCUMENTS

| | | |
|---|---|---|
| JP | H03-207710 A | 9/1991 |
| JP | H03-212414 A | 9/1991 |
| JP | 2003-292719 A | 10/2003 |
| JP | 2007-297502 A | 11/2007 |
| JP | 2010-001458 A | 1/2010 |
| JP | 2011-012196 A | 1/2011 |
| WO | 02/081561 A1 | 10/2002 |
| WO | 2016/133192 A1 | 8/2016 |
| WO | 2018/181801 A1 | 10/2018 |
| WO | 2019/009038 A1 | 1/2019 |
| WO | 2019/026914 A1 | 2/2019 |

OTHER PUBLICATIONS

Jun. 8, 2021 International Search Report issued in Patent Application No. PCT/JP2021/011776.

* cited by examiner

*Primary Examiner* — Deve V Hall
(74) *Attorney, Agent, or Firm* — Oliff PLC

(57) ABSTRACT

A chloroprene-based block copolymer, a latex, a latex composition, and a rubber composition that can produce a product with excellent flexibility and tensile properties without the use of a vulcanizing agent or a vulcanizing accelerator. A chloroprene-based block copolymer, includes 5 to 30% by mass of a polymer block (A) and 70 to 95% by mass of a chloroprene-based polymer block (B), wherein: the polymer block (A) is derived from a monomer; when the monomer is polymerized alone, a polymer with a glass transition temperature of 80° C. or higher can be obtained; the chloroprene-based polymer block (B) includes a chloroprene monomer; and the chloroprene-based block copolymer has a toluene insoluble content of 20 to 100% by mass with respect to 100% by mass of the chloroprene-based block copolymer.

13 Claims, No Drawings

CHLOROPRENE-BASED BLOCK COPOLYMER, LATEX, LATEX COMPOSITION, AND RUBBER COMPOSITION

TECHNICAL FIELD

This invention relates to a chloroprene-based block copolymer, a latex, a latex composition, and a rubber composition.

BACKGROUND ART

Various technologies have been proposed for a chloroprene-based block copolymer containing a chloroprene-based polymer block. Examples of the prior art literature include a copolymer obtained by polymerizing chloroprene with polystyrene containing an azo group as an initiator (see, for example, Patent Literature 1), a copolymer made by polymerizing dithiocarbamated polychloroprene with an aromatic vinyl monomer (see, for example, Patent Literature 2), a copolymer of a chloroprene polymer linked to a hydrophilic oligomer or a hydrophilic polymer (see, for example, Patent Literature 3), a copolymer having a block of an aromatic vinyl compound polymer and a block of a chloroprene polymer, wherein the copolymer has a specific number average molecular weight and the blocks of the chloroprene polymer has a specific number average molecular weight (see, for example, Patent Literature 4), and a copolymer with a block of an acrylic ester polymer and a block of a chloroprene polymer (see, for example, Patent Literature 5).

CITATION LIST

Patent Literature

Patent Literature 1 JP H 3-207710
Patent Literature 2 JP H 3-212414
Patent Literature 3 JP 2007-297502
Patent Literature 4 WO2018/181801
Patent Literature 5 WO2019/026914

SUMMARY OF INVENTION

Technical Problem

Conventionally, a polychloroprene rubber composition needs the use of a vulcanizing agent, such as sulfur, zinc oxide, magnesium oxide, and the like, and a vulcanizing accelerator, such as thiuram-based, dithiocarbamate-based, thiourea-based, guanidine-based, xanthogenate-based, thiazole-based in order to achieve the desired mechanical strength. Since the vulcanizing accelerator is a causative substance of type IV allergy that causes skin diseases such as dermatitis, the reduction or non-use of the vulcanizing accelerator is an important theme. Further, since the non-use of the vulcanizing accelerator leads not only to the reduction of allergies but also to the cost reduction, a rubber composition that exhibits sufficient mechanical strength without using the vulcanizing accelerator is desired.

Therefore, the present invention is to provide a chloroprene-based block copolymer, a latex, a latex composition, and a rubber composition that can produce a product with excellent flexibility and tensile properties without the use of a vulcanizing agent or a vulcanizing accelerator.

Solution to Problem

The present invention is summarized as follows.
(1) A chloroprene-based block copolymer, comprising 5 to 30% by mass of a polymer block (A) and 70 to 95% by mass of a chloroprene-based polymer block (B), wherein:
   the polymer block (A) is derived from a monomer;
   when the monomer is polymerized alone, a polymer with a glass transition temperature of 80° C. or higher can be obtained;
   the chloroprene-based polymer block (B) includes a chloroprene monomer; and
   the chloroprene-based block copolymer has a toluene insoluble content of 20 to 100% by mass with respect to 100% by mass of the chloroprene-based block copolymer.
(2) The chloroprene-based block copolymer of (1), comprising 5 to 15% by mass of the polymer block (A) and 85 to 95% by mass of the chloroprene-based polymer block (B) in 100% by mass of the chloroprene-based block copolymer.
(3) The chloroprene-based block copolymer of (1) or (2), wherein a tensile strength at break measured in accordance with JIS K6251 of a molded body of a latex composition containing the chloroprene-based block copolymer after heat treatment at 130° C. for 30 minutes is 17 MPa or more.
(4) The chloroprene-based block copolymer of any one of (1) to (3), wherein the polymer block (A) has a number average molecular weight of 10,000 or more.
(5) The chloroprene-based block copolymer of any one of (1) to (4), wherein a molecular weight distribution of the polymer block (A) is 2.0 or less.
(6) The chloroprene-based block copolymer of any one of (1) to (5), wherein the polymer block (A) is a polymer block comprising an aromatic vinyl monomer unit.
(7) The chloroprene-based block copolymer of any one of (1) to (6), wherein:
   the chloroprene-based block copolymer has a functional group of the structure represented by formula (1) or formula (2), and

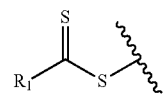

(1)

in formula (1), $R^1$ represents hydrogen, chlorine, substituted or unsubstituted alkyl group, substituted or unsubstituted alkenyl group, substituted or unsubstituted aryl group, mercapto group, or substituted or unsubstituted heterocyclyl group.

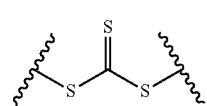

(2)

(8) A latex comprising the chloroprene-based block copolymer of any one of (1) to (7).
(9) A latex composition, comprising 100 parts by mass of the latex of (8) and 0.5 to 5.0 parts by mass of antioxidant.
(10) The latex composition of (9), comprising neither a vulcanizing agent nor a vulcanizing accelerator.

(11) The rubber composition, comprising the chloroprene-based block copolymer of any one of (1) to (7).
(12) The rubber composition, comprising the latex of (8) or (9) to (10).

Effects of Invention

The present invention provides a chloroprene-based block copolymer, a latex, a latex composition, and a rubber composition that produce a product with excellent flexibility and tensile properties without the use of a vulcanizing agent or a vulcanizing accelerator.

DESCRIPTION OF EMBODIMENTS

The following is a detailed description of the embodiment of the invention. In this specification and the claims, the description "A to B" means it is A or more and B or less.
<Chloroprene-Based Block Copolymer>
The chloroprene-based block copolymer comprises a polymer block (A) and a chloroprene-based polymer block (B), wherein
the polymer block (A) is derived from a monomer;
when the monomer is polymerized alone, a polymer with a glass transition temperature of 80° C. or higher can be obtained; and
the chloroprene-based polymer block (B) includes a chloroprene monomer.
The chloroprene-based block copolymer includes a copolymer with a structure in which the block copolymers are chemically bonded to each other.
[Polymer Block (A)]
The polymer block (A) is derived from a monomer and when the monomer is polymerized alone, a polymer with a glass transition temperature of 80° C. or higher can be obtained. The use of such a monomer improves the tensile strength at break of the resulting chloroprene-based block copolymer. Preferably, a monomer, which is polymerized alone to obtain a polymer with a glass transition temperature of 85° C. or higher, may be used. From the viewpoint of moldability, a monomer, which is polymerized alone to obtain a polymer with a glass transition temperature of 150° C. or less, is preferable and a monomer, which is polymerized alone to obtain a polymer with a glass transition temperature of 120° C. or less, is especially preferable. The glass transition temperature may be, for example, 80, 85, 90, 95, 100, 105, 110, 120, 130, 140, 150° C., and may be within the range between any two of the numerical values exemplified here. In this specification, the glass transition temperature is an extrapolated end temperature of glass transition (Teg) measured in accordance with JIS K 7121. When the polymer block (A) is a polymer block obtained by polymerizing a monomer (A), the homopolymer (A) having a number average molecular weight of 10,000 to 30,000 obtained by homopolymerizing the monomer (A) preferably has the above glass transition temperature.

Examples of the monomer unit constituting the polymer block (A) include an aromatic vinyl monomer unit, a methyl methacrylate monomer unit, and an acrylonitrile monomer unit. A unit derived from an aromatic vinyl monomer is preferably used, and a styrene unit is preferably used. The polymer block (A) can be a polymer block obtained by copolymerization of these monomers, or a polymer block comprising a monomer unit copolymerizable with these monomers, as long as the object of the present invention is not impaired.

The number average molecular weight of the polymer block (A) is preferably 10,000 or more from the viewpoint of the tensile properties and moldability of the obtained chloroprene-based block copolymer. Further, the molecular weight distribution of the polymer block (A) is preferably 2.0 or less from the viewpoint of moldability.

In the present specification, the number average molecular weight and the weight average molecular weight are polystyrene-equivalent values measured by gel permeation chromatography (GPC), and are measured values under the measurement conditions described below.
Device: HLC-8320 (manufactured by Tosoh Corporation)
Column: 3 TSKgel GMHHR-H in series
Temperature: 40° C.
Detection: differential refractometer
Solvent: tetrahydrofuran
Calibration curve: made using standard polystyrene (PS).
[Chloroprene-Based Polymer Block (B)]
The chloroprene-based polymer block (B) contains a chloroprene monomer (2-chloro-1,3-butadiene) unit and mainly contains a chloroprene monomer. The chloroprene-based polymer block (B) may be a polymer block comprising a chloroprene monomer unit and a unit derived from another monomer copolymerizable with the chloroprene monomer, as long as the object of the present invention is not impaired. When the chloroprene-based polymer block (B) is 100% by mass, the chloroprene-based polymer block (B) preferably contains 90% by mass or more of structural units derived from a chloroprene monomer. Further, the chloroprene-based polymer block (B) may not contain repeating units other than the structural units derived from chloroprene monomer.

The content of each structural unit in the chloroprene-based block copolymer is 5 to 30% by mass of the polymer block (A) and 70 to 95% by mass of the chloroprene-based polymer block (B), preferably 5 to 15% by mass of the polymer block (A) and 85 to 95% by mass of the chloroprene-based polymer block (B). When the polymer block (A) is 5% by mass or more, the tensile strength at break of the obtained chloroprene-based block copolymer is improved. When the polymer block (A) is 30% by mass or less, the flexibility of the obtained chloroprene-based block copolymer is improved. The polymer block (A) is preferably 15% by mass or less. When the chloroprene-based polymer block (B) is 70% by mass or more, the flexibility of the obtained chloroprene-based block copolymer is improved. The chloroprene-based polymer block (B) is preferably 85% by mass or more. When the chloroprene-based polymer block (B) is 95% by mass or less, the tensile strength at break of the obtained chloroprene-based block copolymer is improved. When the chloroprene-based block copolymer is 100% by mass, the content of the polymer block (A) contained in the chloroprene-based block copolymer is, for example, 5, 10, 15, 20, 25, 30% by mass and may be in the range between the two values exemplified herein.

The chloroprene-based block copolymer according to one embodiment of the present invention may consist of the polymer block (A) and the polymer block (B), and may not contain other polymer blocks. The chloroprene-based block copolymer can be a diblock copolymer of the polymer block (A) and the polymer block (B).

The weight average molecular weight of the chloroprene-based block copolymer is not particularly limited, but from the viewpoint of moldability, it is preferably 50,000 to 600,000, and more preferably 100,000 to 500,000.

The toluene insoluble content of the chloroprene-based block copolymer according to the embodiment of the present invention ranges from 20 to 100% by mass. When the toluene insoluble content is 20 mass % or more, the tensile strength at break is improved.

A tensile strength at break measured in accordance with JIS K6251 of the molded body of the latex composition containing the chloroprene-based block copolymer of the present embodiment after heat treatment at 130° C. for 30 minutes is preferably 17 MPa or more. The tensile strength at break is more preferably 18 MPa or more, further preferably 19 MPa or more, and even more preferably 20 MPa or more. The upper limit is not particularly limited, but is, for example, 30 MPa or less.

Further, an elongation at break measured in accordance with JIS K6251 of the molded body of the latex composition containing the chloroprene-based block copolymer of the present embodiment after heat treatment at 130° C. for 30 minutes is preferably 900% or more, more preferably 905% or more, and even more preferably 910% or more. The upper limit is not particularly limited, but is, for example, 1300% or less.

A modulus at 500% elongation measured in accordance with JIS K6251 of the molded body of the latex composition containing the chloroprene-based block copolymer of the present embodiment after heat treatment at 130° C. for 30 minutes is preferably 3.0 MPa or less, more preferably 2.9 MPa or less, and even more preferably 2.8 MPa. The lower limit is not particularly limited, but is, for example, 1.0 MPa or higher.

The molded body of the latex composition containing the chloroprene-based block copolymer of the present embodiment after heat treatment at 130° C. for 30 minutes has the above-mentioned tensile strength at break, elongation at break, and modulus at 500% elongation. The molded body may be molded without using a vulcanization agent and a vulcanizing accelerator. The molded body for measuring tensile properties can be obtained by the methods described in the Examples.

To adjust the tensile strength at brake, elongation at break, and modulus at 500% elongation of the chloroprene-based block copolymer, the toluene insoluble content of the chloroprene-based block copolymer can be adjusted, or the content of the polymer block (A) in the chloroprene-based block copolymer can be adjusted.

[Method of Producing Chloroprene-Based Block Copolymer]

A method for producing the chloroprene-based block copolymer according to the present invention will be described. The polymerization mode is not particularly limited and can be produced by known methods such as solution polymerization, emulsion polymerization, and bulk polymerization, but emulsion polymerization is suitable for obtaining the desired chloroprene-based block copolymer.

The polymerization method is not particularly limited as long as the desired chloroprene-based block copolymer can be obtained. It can be produced by a two-step polymerization step comprising polymerization step 1 to synthesize the polymer block (A) and subsequent polymerization step 2 to synthesize the chloroprene-based polymer block (B). The method of producing the chloroprene-based block copolymer according to one embodiment of the present invention comprises polymerization step 1 and polymerization step 2, wherein, in polymerization step 1, a raw material containing the monomer (A) is polymerized to synthesize polymer block (A), and, in polymerization step 2, a raw material containing pure water, emulsifier, and chloroprene monomer is added to the latex containing the polymer block (A) obtained by living radical emulsion polymerization in polymerization step 1 and emulsion polymerization is performed to obtain a latex containing the chloroprene-based block copolymer.

(Polymerization Step 1)

Polymerization step 1 will be explained in detail. In polymerization step 1, the polymer block (A) is synthesized by living radical emulsion polymerization of the monomer constituting the polymer block (A). As described above, the polymer block (A) obtained here preferably has the glass transition temperature described above. The emulsifier used in the emulsion polymerization is not particularly limited, but an anion-based or nonionic-based emulsifier is preferable from the viewpoint of emulsion stability. It is preferable to use an alkali metal rosinate because the obtained chloroprene-based block copolymer can have appropriate strength to prevent excessive shrinkage and breakage. The concentration of the emulsifier is preferably 5 to 50% by mass with respect to 100% by mass of the monomer constituting the polymer block (A) from the viewpoint of efficiently performing the polymerization reaction. As the radical polymerization initiator, a known radical polymerization initiator can be used, and for example, potassium persulfate, benzoyl peroxide, hydrogen peroxide, an azo compound, and the like can be used. The amount of pure water added is preferably 100 to 300% by mass with respect to 100% by mass of the monomer constituting the polymer block (A). When the amount of pure water added is 300% by mass or less, the toluene insoluble content of the obtained chloroprene-based block copolymer is 20% by mass or more, and the tensile strength at brake is improved. The polymerization temperature may be appropriately determined depending on the type of the monomer, but is preferably 10 to 100° C., more preferably 20 to 80° C.

(Polymerization Step 2)

In polymerization step 2, pure water, an emulsifier, and chloroprene monomer are added to the latex containing the polymer block (A) obtained by the living radical emulsion polymerization of polymerization step 1, and an emulsion polymerization is performed to obtain a latex containing the desired chloroprene-based block copolymer. The chloroprene monomer may be added all at once or added in a plurality of times. The polymerization temperature in the polymerization step 2 is preferably 10 to 50° C. from the viewpoint of ease of polymerization control. The polymerization reaction is stopped by adding a polymerization inhibitor. Examples of the polymerization inhibitor include thiodiphenylamine, 4-tert-butylpyrocatechol, 2,2'-methylenebis(4-methyl-6-tert-butylphenol) and the like. After the completion of the emulsion polymerization, the unreacted monomer can be removed by a conventional method such as vacuum distillation. By the production method according to one embodiment of the present invention exemplified above, the chloroprene-based block copolymer having an appropriate toluene insoluble content can be obtained more easily.

To the latex containing the chloroprene-based block copolymer obtained in the polymerization step 2, a freeze stabilizer, an emulsion stabilizer, a viscosity modifier, an antioxidant, and a preservative can be added after the polymerization, as long as the object of the present invention is not impaired.

(Recovery Step)

The method for recovering the chloroprene-based block copolymer from the latex containing the chloroprene-based block copolymer is not particularly limited and a known method, such as a method of recovering by immersing in a coagulating liquid and a method of precipitating with a poor solvent such as methanol, is used.

The chloroprene-based block copolymer preferably has a functional group having a structure represented by the following formula (1) or formula (2).

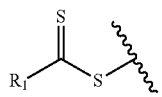

(1)

In formula (1), $R^1$ represents hydrogen, chlorine, substituted or unsubstituted alkyl group, substituted or unsubstituted alkenyl group, substituted or unsubstituted aryl group, mercapto group, or substituted or unsubstituted heterocyclyl group.

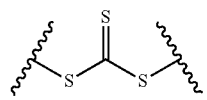

(2)

The terminal structure represented by above formula (1) or formula (2) is introduced into the block copolymer by performing emulsion polymerization in the presence of a known RAFT agent. The compound that derives the structure represented by above formula (1) is not particularly limited, and a general compound can be used. Examples thereof include dithiocarbamates and dithioesters. Specifically, benzyl1-pyrrolecarbodithioate (common name: benzyl1-pyrroldithiocarbamate), benzylphenylcarbodithioate, 1-benzyl-N, N-dimethyl-4-aminodithiobenzoate, 1-benzyl-4-methoxydithiobenzoate, 1-phenylethylimidazole carbodithioate (common name: 1-phenylethylimidazole dithiocarbamate), benzyl-1-(2-pyrrolidinone) carbodithioate, (common name: benzyl-1-(2-pyrrolidinone)dithiocarbamate), benzylphthalimidylcarbodithioate, (common name: benzylphthalimidyl dithiocarbamate), 2-cyanoprop-2-yl-1-pyrrolecarbodithioate, (common name: 2-cyanoprop-2-yl-1-pyrroledithiocarbamate), 2-cyanobut-2-yl-1-pyrrolecarbodithioate, (common name: 2-cyanobut-2-yl-1-pyrrole dithiocarbamate), benzyl-1-imidazole carbodithioate, (common name: benzyl-1-imidazole dithiocarbamate), 2-cyanoprop-2-yl-N, N-dimethyldithiocarbamate, benzyl-N, N-diethyldithiocarbamate, cyanomethyl-1-(2-pyrrolidone) dithiocarbamate, 2-(ethoxycarbonylbenzyl) prop-2-yl-N, N-diethyldithiocarbamate, 1-phenylethyldithiobenzoate, 2-phenylprop-2-yldithiobenzoate, 1-acetic acid-1-yl-ethyl-dithiobenzoate, 1-(4-methoxyphenyl)ethyldithiobenzoate, benzyldithioacetate, ethoxycarbonylmethyldithioacetate, 2-(ethoxycarbonyl) prop-2-yldithiobenzoate, 2-cyanoprop-2-yldithiobenzoate, tert-butyldithiobenzoate, 2,4,4-trimethylpenta-2-yldithiobenzoate, 2-(4-chlorophenyl)-prop-2-yl-dithiobenzoate, 3-vinylbenzyldithiobenzoate, 4-vinylbenzyldithiobenzoate, benzyldiethoxyphosphinyldithioformate, tert-butyltrithioperbenzoate, 2-phenylprop-2-yl-4-chlorodithiobenzoate, naphthalene-1-carboxylic acid-1-methyl-1-phenyl-ethyl ester, 4-cyano-4-methyl-4-thiobenzylsulfanylbutyric acid, dibenzyltetrathioterephthalate, carboxymethyldithiobenzoate, poly(ethylene oxide) with a dithiobenzoate terminal group, poly(ethylene oxide) with 4-cyano-4-methyl-4-thiobenzylsulfanylbutyric acid terminal group, 2-[(2-phenylethanethioyl)sulfanyl] propanoic acid, 2-[(2-phenylethanethioyl) sulfanyl] succinic acid, 3,5-dimethyl-1H-pyrazole-1-carbodithioate potassium, cyanomethyl-3,5-dimethyl-1H-pyrazole-1-carbodithioate, cyanomethylmethylphenyl)dithiocarbamate, benzyl-4-chlorodithiobenzoate, phenylmethyl-4-chlorodithiobenzoate, 4-nitrobenzyl-4-chlorodithiobenzoate, phenylprop-2-yl-4-chlorodithiobenzoate, 1-cyano-1-methylethyl-4-chlorodithiobenzoate, 3-chloro-2-butenyl-4-chlorodithiobenzoate, 2-chloro-2-butenyldithiobenzoate, benzyldithioacetate, 3-chloro-2-butenyl-1H-pyrrole-1-dithiocarboxylic acid, 2-cyanobutane-2-yl 4-chloro-3,5-dimethyl-1H-pyrazole-1-carbodithioate and cyanomethylmethyl(phenyl) carbamodithioate. Of these, benzyl1-pyrrole carbodithioate and benzylphenylcarbodithioate are particularly preferable. The compound that derives the structure represented by the above formula (2) is not particularly limited, and a general compound can be used. For example, trithiocarbonates such as 2-cyano-2-propyldodecyltrithiocarbonate, dibenzyltrithiocarbonate, butylbenzyltrithiocarbonate, 2-[[(butylthio) thioxomethyl] thio] propionic acid, 2-[[(dodecylthio)thioxomethyl] thio] propionic acid, 2-[[(butylthio)thioxomethyl] thio] succinic acid, 2-[[(dodecylthio)thioxomethyl] thio] succinic acid, 2-[[(dodecylthio)thioxomethyl] thio]-2-methylpropionic acid, 2,2'-[carbonothioylbis(thio)] bis [2-methylpropionic acid], 2-amino-1-methyl-2-oxoethylbutyltrithiocarbonate, benzyl2-[(2-hydroxyethyl)amino]-1-methyl-2-oxoethyltrithiocarbonate, 3-[[[(tert-butyl)thio] thioxomethyl] thio] propionic acid, cyanomethyldodecyltrithiocarbonate, diethylaminobenzyltrithiocarbonate, and dibutylaminobenzyltrithiocarbonate can be mentioned. Of these, dibenzyltrithiocarbonate and butylbenzyltrithiocarbonate are particularly preferably used.

[Toluene Insoluble Content]

The toluene insoluble content of the chloroprene-based block copolymer of the present embodiment is in the range of 20 to 100% by mass with respect to 100% by mass of the chloroprene-based block copolymer. When the toluene insoluble content is 20% by mass or more, a structure in which the block copolymers are chemically bonded to each other is included, and the tensile strength at break is improved. The toluene insoluble content can be, for example, 20, 25, 30, 35, 40, 45, 50, 55, 60, 65, 70, 75, 80, 85, 90, 95, 100% by mass, and may be within the range between any two of the numerical values exemplified here. In the present specification, the toluene insoluble content is obtained by dissolving a freeze-dried latex containing the chloroprene-based block copolymer in toluene, centrifuging the resulting mixture, separating the gel component by a 200-mesh wire mesh, measuring the weight of the dried gel component and calculating with the following formula.

(Weight of the solid obtained by separating and drying the gel component)/(Weight of the solid obtained by freeze-drying latex containing the chloroprene-based block copolymer)×100

The toluene insoluble content can be adjusted by controlling the type and amount of the raw material compounded in the polymerization of the chloroprene-based block copolymer and the polymerization conditions and controlling the type and amount of the polymer block, for example, the type, amount, and structure of functional group derived from the RAFT agent and the like.

<Latex>

The latex according to the present embodiment is a latex containing the chloroprene-based block copolymer. An immersion molded body can be obtained by immersing this latex in a coagulating liquid and molding. The immersion molded body can be suitably used for gloves, balloons, catheters, and boots.

The latex of the present embodiment can be obtained by a method of using the synthesized liquid, which is obtained at the end of emulsion polymerization as described in the method for producing the chloroprene-based block copolymer, as the latex as it is, or a method of forcibly emulsifying the recovered chloroprene-based block copolymer using an emulsifier to obtain the latex. The method of using the synthesized liquid, which is obtained at the end of emulsion polymerization, as the latex is preferable because the latex can be easily obtained.

<Latex Composition and Rubber Composition>

The latex composition according to the present embodiment contains the chloroprene-based block copolymer. The rubber composition according to the present embodiment is also a rubber composition containing the chloroprene-based block copolymer. Raw materials other than the chloroprene-based block copolymer are not particularly limited and can be selected according to the purpose and application. Examples of the Raw materials, which can be included in the latex composition and rubber composition containing the chloroprene-based block copolymer, can include, for example, a vulcanizing agent, a vulcanizing accelerator, fillers or a reinforcing agent, a plasticizer, a processing aid and a lubricant, an antioxidant, and a silane coupling agent.

The latex composition/rubber composition of the present embodiment may contain a vulcanizing agent or a vulcanizing accelerator. When the latex composition/rubber composition according to one embodiment of the present invention contains a vulcanizing agent and/or a vulcanizing accelerator, the total content of the vulcanizing agent and the vulcanizing accelerator can be 5% by mass or less, more preferably 1% by mass or less, and even more preferably 0.1% by mass or less with respect to 100% by mass of the latex composition/rubber composition. However, the latex composition/rubber composition containing the chloroprene-based block copolymer of the present embodiment exhibits sufficient mechanical strength without vulcanization. Therefore, from the viewpoint of reduction of allergies and the cost reduction, those containing neither a vulcanizing agent nor vulcanizing accelerator are preferable.

As an antioxidant that improves heat resistance, a primary antioxidant that captures radicals and prevents autoxidation, which is used in ordinary rubber applications, and a secondary antioxidant that renders hydroperoxide harmless can be added. The amount of these antioxidants added can be 0.1 part by mass or more and 10 parts by mass or less, preferably 2 parts by mass and 5 parts by mass or less, with respect to 100 parts by mass of the latex component in the latex composition and the rubber composition. These antioxidants can be used alone, or two or more of these can be used in combination. Examples of the primary antioxidant may include phenol-based antioxidants, amine-based antioxidants, acrylate-based antioxidants, imidazole-based antioxidants, carbamic acid metal salts, and waxes. In addition, examples of the secondary antioxidant may include phosphorus-based antioxidants, sulfur-based antioxidants, and imidazole-based antioxidants. Examples of the antioxidant are not particularly limited and may include N-phenyl-1-naphthylamine, alkylated diphenylamine, octylated diphenylamine, 4,4'-bis($\alpha,\alpha$-dimethylbenzyl)diphenylamine, p-(p-toluenesulfonylamide)diphenylamine, N, N'-di-2-naphthyl-p-phenylenediamine, N, N'-diphenyl-p-phenylenediamine, N-phenyl-N'-isopropyl-p-phenylenediamine, N-phenyl-N'-(1,3-dimethylbutyl)-p-phenylenediamine, N-phenyl-N'-(3-methacryloyloxy-2-hydroxypropyl)-p-phenylenediamine, 1,1,3-tris-(2-methyl-4-hydroxy-5-t-butylphenyl) butane, 4,4'-butylidenebis-(3-methyl-6-t-butylphenol), 2,2-thiobis(4-methyl 6 t butylphenol), 7-octadecyl-3-(4'-hydroxy-3', 5 '-di-t-butylphenyl) propionate, tetrakis-[methylene-3-(3', 5'-di-t-butyl-4'-hydroxyphenyl) propionate] methane, pentaerythritol-tetrakis [3-(3, 5-di-t-butyl-4-hydroxyphenyl) propionate], triethylene glycol-bis [3-(3-t-butyl-5-methyl-4-hydroxyphenyl) propionate], 1,6-hexanediol-bis [3-(3,5-di-t-butyl-4-hydroxyphenyl) propionate], 2,4-bis(n-octylthio)-6-(4-hydroxy-3,5-di-t-butylanilino)-1,3,5-triazine, tris3,5-di-t-butyl-4-hydroxybenzyl)-isocyanurate, 2,2-thio-diethylene bis [3-(3, 5-di-t-butyl-4-hydroxyphenyl) propionate], N, N'-hexamethylenebis(3,5-di-t-butyl-4-hydroxy)-hydrocinnaamide, 2,4-bis [(octylthio)methyl]o-cresol, 3,5-di-t-butyl-4-hydroxybenzyl-phosphonate-diethyl ester, tetrakis [methylene (3,5-di-t-butyl-4-hydroxyhydrocinnamate)] methane, octadecyl-3-(3,5-di-t-butyl-4-hydroxyphenyl) propionic acid ester, 3,9-bis [2-{3-(3-t-butyl-4-hydroxy-5-methylphenyl) propionyloxy}-1,1-dimethylethyl]-2,4,8,10-tetraoxaspiro [5.5] undecane, tris(nonyl phenyl) phosphite, tris(mixed mono- and di-nonylphenyl) phosphite, diphenyl mono(2-ethylhexyl)phosphite, diphenyl monotridecyl phosphite, diphenyl isodecyl phosphite, diphenyl isooctyl phosphite, diphenyl nonylphenyl phosphite, triphenylphosphite, tris (tridecyl)phosphite, triisodecylphosphite, tris(2-ethylhexyl) phosphite, tris(2,4-di-t-butylphenyl) phosphite, tetraphenyl-dipropylene glycol diphosphite, tetraphenyltetra(tridecylic) pentaerythritol tetraphosphite, 1,1,3-tris(2-methyl-4-di-tri-decylphosphite-5-t-butylphenyl) butane, 4,4'-butylidenebis-(3-methyl-6-t-butyl-di-tridecylphosphite), 2,2'-etilidenebis (4,6-di-t-butylphenol) fluorophosphite, 4,4'-isopropylidene-diphenolalkyl(C12-C15)phosphite, cyclic neopentane tetraylbis(2,4-di-t-butylphenylphosphite), cyclic neopentane tetraylbis(2,6-di-t-butyl-4-phenylphosphite), cyclic neopentane tetraylbis(nonylphenylphosphite), bis (nonylphenyl) pentaerythritol diphosphite, dibutyl hydrogen phosphite, distearyl pentaerythritol diphosphite and hydrogenated bisphenol A pentaerythritol phosphite polymer, 2-mercaptobenzimidazole, butylation reaction products of p-cresol and dicyclopentadiene.

The rubber composition can be produced according to a conventional method using a known machine or device.

EXAMPLES

Hereinafter, the present invention will be described with reference to Examples and Comparative Examples, but these are merely exemplary and do not limit the content of the present invention.

Example 1

(Polymerization Step 1) Synthesis of Polymer Block (A-1)

Polymerization was carried out using an autoclave with a capacity of 10 L and a stirrer and a jacket for heating and cooling. 5450 g of pure water, 262 g of disproportionated potassium rosinate (manufactured by Harima Chemicals Group, Inc.), 42.5 g of potassium hydroxide, 21.8 g of a sodium salt of β-naphthalene sulfonic acid formalin condensate (manufactured by Kao Corporation, product name: DEMOL N), 2500 g of styrene monomer and 43.3 g of butylbenzyl trithiocarbonate were charged, the internal temperature was set to 80° C., and the mixture was stirred under a nitrogen stream at 200 rpm. By adding 27.3 g of 2,2'-azobis [2-(2-imidazolin-2-yl) propane] dihydrochloride (manufactured by FUJIFILM Wako Pure Chemical Corporation, product name: VA-044) as a polymerization initiator, polymerization was started. For the measurement of physical properties, 20 ml of the obtained latex was sampled, and the remaining latex was used in the polymerization step 2.

The sampled latex was mixed with a large amount of methanol to precipitate a resin component and the precipitate was filtered and dried to obtain a sample of the polymer block (A-1). By analyzing the obtained sample, the number average molecular weight, molecular weight distribution, and glass transition temperature of the polymer block (A) were determined. The analysis results are shown in Table 1. The methods for measuring the "number average molecular weight", "molecular weight distribution", and "glass transition temperature" will be described later.

(Polymerization Step 2) Synthesis of Chloroprene-Based Polymer Block (B-1)

Polymerization was carried out using an autoclave with a capacity of 10 L and a stirrer and a jacket for heating and cooling. 2732 g of pure water, 131 g of disproportionated potassium rosinate (manufactured by Harima Chemicals Group, Inc.), 21.3 g of potassium hydroxide, 10.9 g of a sodium salt of β-naphthalene sulfonic acid formalin condensate (manufactured by Kao Corporation, product name: DEMOL N), 783 g of the latex containing the polymer block (A-1) prepared in the polymerization step 1 were charged, the internal temperature was set to 45° C., and the mixture was stirred at 200 rpm under a nitrogen stream. Then, 3000 g of chloroprene monomer was slowly added over 2 hours to carry out polymerization. When the polymerization rate of the chloroprene monomer reaches 80%, the polymerization was stopped by adding a 10% by weight aqueous solution of N, N-diethylhydroxylamine, which is a polymerization inhibitor, and the unreacted chloroprene monomer was removed by vacuum distillation. For the measurement of physical properties, 20 ml of the obtained latex was sampled, and the remaining latex was used to prepare a film for evaluation.

The sampled latex was mixed with a large amount of methanol to precipitate the resin component and the precipitate was filtered and dried to obtain a sample of the chloroprene-based block copolymer. By analyzing the obtained sample, the content (mass %) of the polymer block (A-1) and chloroprene-based polymer block (B-1) in the chloroprene-based block copolymer were determined. The analysis results are shown in Table 1. The measurement method is described below. The toluene insoluble content was also determined using the latex sampled. The analysis results are shown in Table 1. The measurement method is described below.

Example 2

(Polymerization Step 1) Synthesis of Polymer Block (A-2)

Polymerization was carried out in the same procedure as in Example 1 to synthesize a polymer block (A-2). For the measurement of physical properties, 20 ml of the obtained latex was sampled, and the remaining latex was used in the polymerization step 2. The number average molecular weight, molecular weight distribution, and glass transition temperature of the polymer block (A-2) were determined by analysis in the same manner as in Example 1. The analysis results are shown in Table 1.

(Polymerization Step 2) Synthesis of Chloroprene-Based Polymer Block (B-2)

Polymerization was carried out using an autoclave with a capacity of 10 L and a stirrer and a jacket for heating and cooling. 2950 g of pure water, 142 g of disproportionated potassium rosinate (manufactured by Harima Chemicals Group, Inc.), 23 g of potassium hydroxide, 11.8 g of a sodium salt of β-naphthalene sulfonic acid formarin condensate (manufactured by Kao Corporation, product name: DEMOL N), 448 g of the latex containing the polymer block (A-2) prepared in the polymerization step 1 was charged, the internal temperature was set to 45° C., and the mixture was stirred at 200 rpm under a nitrogen stream. Then, 3000 g of chloroprene monomer was slowly added over 2 hours to carry out polymerization. When the polymerization rate of the chloroprene monomer reaches 80%, the polymerization was stopped by adding a 10% by weight aqueous solution of N, N-diethylhydroxylamine, which is a polymerization inhibitor, and the unreacted chloroprene monomer was removed by vacuum distillation. For the measurement of physical properties, 20 ml of the obtained latex was sampled, and the remaining latex was used to prepare a film for evaluation. The content (mass %) of the polymer block (A-2) and the chloroprene-based polymer block (B-2) in the chloroprene-based block copolymer and the toluene insoluble content were determined by analysis in the same manner as in Example 1. The analysis results are shown in Table 1.

Example 3

(Polymerization Step 1) Synthesis of Polymer Block (A-3)

Polymerization was carried out in the same procedure as in Example 1 to synthesize a polymer block (A-3). For the measurement of physical properties, 20 ml of the obtained latex was sampled, and the remaining latex was used in the polymerization step 2. The number average molecular weight, molecular weight distribution, and glass transition temperature of the polymer block (A-3) were determined by analysis in the same manner as in Example 1. The analysis results are shown in Table 1.

(Polymerization Step 2) Synthesis of Chloroprene-Based Polymer Block (B-3)

Polymerization was carried out using an autoclave with a capacity of 10 L and a stirrer and a jacket for heating and cooling. 2334 g of pure water, 112 g of disproportionated potassium rosinate (manufactured by Harima Chemicals Group, Inc.), 18.2 g of potassium hydroxide, 9.3 g of a sodium salt of β-naphthalene sulfonic acid formalin condensate (manufactured by Kao Corporation, product name: DEMOL N), 1392 g of the latex containing the polymer block (A-3) prepared in the polymerization step 1 were charged, the internal temperature was set to 45° C., and the mixture was stirred at 200 rpm under a nitrogen stream. Then, 3000 g of chloroprene monomer was slowly added over 2 hours to carry out polymerization. When the polymerization rate of the chloroprene monomer reaches 80%, the polymerization was stopped by adding a 10% by weight aqueous solution of N, N-diethylhydroxylamine, which is a polymerization inhibitor, and the unreacted chloroprene monomer was removed by vacuum distillation. For the measurement of physical properties, 20 ml of the obtained latex was sampled, and the remaining latex was used to prepare a film for evaluation. The content (mass %) of the polymer block (A-3) and the chloroprene-based polymer block (B-3) in the chloroprene-based block copolymer and the toluene insoluble content were determined by analysis in the same manner as in Example 1. The analysis results are shown in Table 1.

Example 4

(Polymerization Step 1) Synthesis of Polymer Block (A-4)

Polymerization was carried out using an autoclave with a capacity of 10 L and a stirrer and a jacket for heating and cooling. 5450 g of pure water, 262 g of disproportionated potassium rosinate (manufactured by Harima Chemicals Group, Inc.), 42.5 g of potassium hydroxide, 21.8 g of a sodium salt of sodium salt of β-naphthalene sulfonic acid formalin condensate (manufactured by Kao Corporation, product name: DEMOL N), 2500 g of styrene monomer and 32.5 g of butylbenzyl trithiocarbonate were charged, the internal temperature was set to 80° C., and the mixture was stirred under a nitrogen stream at 200 rpm. By adding 20.5 g of 2,2'-azobis [2-(2-imidazolin-2-yl) propane] dihydrochloride (manufactured by FUJIFILM Wako Pure Chemical Corporation, product name: VA-044) as a polymerization initiator, polymerization was started. For the measurement of physical properties, 20 ml of the obtained latex was sampled, and the remaining latex was used in the polymerization step 2. The number average molecular weight, molecular weight distribution, and glass transition temperature of the polymer block (A-4) were determined by analysis in the same manner as in Example 1. The analysis results are shown in Table 1.

(Polymerization Step 2) Synthesis of Chloroprene-Based Polymer Block (B-4)

Polymerization was carried out using an autoclave with a capacity of 10 L and a stirrer and a jacket for heating and cooling. 1188 g of pure water, 57 g of disproportionated potassium rosinate (manufactured by Harima Chemicals Group, Inc.), 9.3 g of potassium hydroxide, 4.8 g of a sodium salt of β-naphthalene sulfonic acid formalin condensate (manufactured by Kao Corporation, product name: Demol N), 3147 g of the latex containing the polymer block (A-4) prepared in the polymerization step 1 were charged, the internal temperature was set to 45° C., and the mixture was stirred at 200 rpm under a nitrogen stream. Then, 3000 g of chloroprene monomer was slowly added over 2 hours to carry out polymerization. When the polymerization rate of the chloroprene monomer reaches 80%, the polymerization was stopped by adding a 10% by weight aqueous solution of N, N-diethylhydroxylamine, which is a polymerization inhibitor, and the unreacted chloroprene monomer was removed by vacuum distillation. For the measurement of physical properties, 20 ml of the obtained latex was sampled, and the remaining latex was used to prepare a film for evaluation. The content (mass %) of the polymer block (A-4) and the chloroprene-based polymer block (B-4) in the chloroprene-based block copolymer and the toluene insoluble content were determined by analysis in the same manner as in Example 1. The analysis results are shown in Table 1.

Example 5

(Polymerization Step 1) Synthesis of Polymer Block (A-5)

Polymerization was carried out using an autoclave with a capacity of 10 L and a stirrer and a jacket for heating and cooling. 5450 g of pure water, 262 g of disproportionated potassium rosinate (manufactured by Harima Chemicals Group, Inc.), 42.5 g of potassium hydroxide, 21.8 g of a sodium salt of β-naphthalene sulfonic acid formalin condensate (manufactured by Kao Corporation, product name: DEMOL N), 2500 g of methyl methacrylate monomer and 29.6 g of butyl-2-cyanoisopropyltrithiocarbonate were charged, the internal temperature was set to 80° C., and the mixture was stirred under a nitrogen stream at 200 rpm. By adding 20.5 g of 2,2'-azobis [2-(2-imidazolin-2-yl) propane] dihydrochloride (manufactured by FUJIFILM Wako Pure Chemical Corporation, product name: VA-044) as a polymerization initiator, polymerization was started. For the measurement of physical properties, 20 ml of the obtained latex was sampled, and the remaining latex was used in the polymerization step 2. The number average molecular weight, molecular weight distribution, and glass transition temperature of the polymer block (A-5) were determined by analysis in the same manner as in Example 1. The analysis results are shown in Table 1.

(Polymerization Step 2) Synthesis of Chloroprene-Based Polymer Block (B-5)

Polymerization was carried out using an autoclave with a capacity of 10 L and a stirrer and a jacket for heating and cooling. 2732 g of pure water, 131.14 g of disproportionated potassium rosinate (manufactured by Harima Chemicals Group, Inc.), 21.3 g of potassium hydroxide, 10.9 g of a sodium salt of β-naphthalene sulfonic acid formalin condensate (manufactured by Kao Corporation, product name: DEMOL N), and 783 of the latex containing the polymer block (A-5) prepared in the polymerization step 1 were charged, the internal temperature was set to 45° C., and the mixture was stirred at 200 rpm under a nitrogen stream. Then, 3000 g of chloroprene monomer was slowly added over 2 hours to carry out polymerization. When the polymerization rate of the chloroprene monomer reaches 80%, the polymerization was stopped by adding a 10% by weight aqueous solution of N, N-diethylhydroxylamine, which is a polymerization inhibitor, and the unreacted chloroprene monomer was removed by vacuum distillation. For the measurement of physical properties, 20 ml of the obtained latex was sampled, and the remaining latex was used to prepare a film for evaluation. The content (mass %) of the polymer block (A-5) and the chloroprene-based polymer block (B-5) in the chloroprene-based block copolymer and the toluene insoluble content were determined by analysis in the same manner as in Example 1. The analysis results are shown in Table 1.

Comparative Example 1

(Polymerization Step 1) Synthesis of Polymer Block (A-6)

Polymerization was carried out according to the same procedure as in Example 1 to synthesize the polymer block (A-6). For the measurement of physical properties, 20 ml of the obtained latex was sampled, and the remaining latex was used for polymerization step 2. The number average molecular weight, molecular weight distribution, and glass transition temperature of the polymer block (A-6) were determined in the same manner as in Example 1. The analysis results are shown in Table 1.

(Polymerization Step 2) Synthesis of Chloroprene-Based Polymer Block (B-6)

Polymerization was carried out using an autoclave with a capacity of 10 L and a stirrer and a jacket for heating and cooling. 3036 g of pure water, 146 g of disproportionated potassium rosinate (manufactured by Harima Chemicals Group, Inc.), 23.7 g of potassium hydroxide, 12.2 g of a sodium salt of β-naphthalene sulfonic acid formalin condensate (manufactured by Kao Corporation, product name: DEMOL N), 316.5 g of the latex containing the polymer block (A-6) prepared in the polymerization step 1 were charged, the internal temperature was set to 45° C., and the mixture was stirred at 200 rpm under a nitrogen stream. Then, 3000 g of chloroprene monomer was slowly added over 2 hours to carry out polymerization. When the polymerization rate of the chloroprene monomer reaches 80%, the polymerization was stopped by adding a 10% by weight aqueous solution of N, N-diethylhydroxylamine, which is a polymerization inhibitor, and the unreacted chloroprene monomer was removed by vacuum distillation. For the measurement of physical properties, 20 ml of the obtained latex was sampled, and the remaining latex was used to prepare a film for evaluation. The content (mass %) of the polymer block (A-6) and the chloroprene-based polymer block (B-6) in the chloroprene-based block copolymer and the toluene insoluble content were determined by analysis in the same manner as in Example 1. The analysis results are shown in Table 1.

Comparative Example 2

(Polymerization Step 1) Synthesis of Polymer Block (A-7)

Polymerization was carried out using an autoclave with a capacity of 10 L and a stirrer and a jacket for heating and cooling. 5450 g of pure water, 262 g of disproportionated potassium rosinate (manufactured by Harima Chemicals Group, Inc.), 42.5 g of potassium hydroxide, 21.8 g of a sodium salt of β-naphthalene sulfonic acid formalin condensate (manufactured by Kao Corporation, product name: DEMOL N), 2500 g of styrene monomer and 21.4 g of butylbenzyl trithiocarbonate were charged, the internal temperature was set to 80° C., and the mixture was stirred under a nitrogen stream at 200 rpm. By adding 13.5 g of 2,2'-azobis [2-(2-imidazolin-2-yl) propane] dihydrochloride (manufactured by FUJIFILM Wako Pure Chemical Corporation, product name: VA-044), polymerization was started as a polymerization initiator. For the measurement of physical properties, 20 ml of the obtained latex was sampled, and the remaining latex was used in the polymerization step 2. The number average molecular weight, molecular weight distribution, and glass transition temperature of the polymer block (A-7) were determined by analysis in the same manner as in Example 1. The analysis results are shown in Table 1.

(Polymerization Step 2) Synthesis of Chloroprene-Based Polymer Block (B-7)

Polymerization was carried out using an autoclave with a capacity of 10 L and a stirrer and a jacket for heating and cooling. 747 g of pure water, 36 g of disproportionated potassium rosinate (manufactured by Harima Chemicals Group, Inc.), 5.8 g of potassium hydroxide, 3.0 g of a sodium salt of β-naphthalene sulfonic acid formalin condensate (manufactured by Kao Corporation, product name: DEMOL N), 3822.9 g of the latex containing the polymer block (A-7) prepared in the polymerization step 1 were charged, the internal temperature was set to 45° C., and the mixture was stirred at 200 rpm under a nitrogen stream. Then, 3000 g of chloroprene monomer was slowly added over 2 hours to carry out polymerization. When the polymerization rate of the chloroprene monomer reaches 80%, the polymerization was stopped by adding a 10% by weight aqueous solution of N, N-diethylhydroxylamine, which is a polymerization inhibitor, and the unreacted chloroprene monomer was removed by vacuum distillation. For the measurement of physical properties, 20 ml of the obtained latex was sampled, and the remaining latex was used to prepare a film for evaluation. The content (mass %) of the polymer block (A-7) and the chloroprene-based polymer block (B-7) in the chloroprene-based block copolymer and the toluene insoluble content were determined by analysis in the same manner as in Example 1. The analysis results are shown in Table 1.

Comparative Example 3

Synthesis of Copolymer of Chloroprene-Based Polymer Block (B-8) Only

Polymerization was carried out using an autoclave with a capacity of 10 L and a stirrer and a jacket for heating and cooling. 3600 g of pure water, 175 g of disproportionated potassium rosinate (manufactured by Harima Chemicals Group, Inc.), 28.4 g of potassium hydroxide, 16.0 g of a sodium salt of β-naphthalene sulfonic acid formalin condensate (manufactured by Kao Corporation, product name: DEMOL N), 4000 g of chloroprene monomer and 4.72 g of butylbenzyl trithiocarbonate were charged, the internal temperature was set to 45° C., and the mixture was stirred under a nitrogen stream at 200 rpm. By adding 2.96 g of 2,2'-azobis [2-(2-imidazolin-2-yl) propane] dihydrochloride (manufactured by FUJIFILM Wako Pure Chemical Corporation, product name: VA-044) as a polymerization initiator, polymerization was started. When the polymerization rate of the chloroprene monomer reaches 80%, the polymerization was stopped by adding a 10% by weight aqueous solution of N, N-diethylhydroxylamine, which is a polymerization inhibitor, and the unreacted chloroprene monomer was removed by vacuum distillation. For the measurement of physical properties, 20 ml of the obtained latex was sampled, and the remaining latex was used to prepare a film for evaluation. The toluene insoluble content was determined by analysis in the same manner as in Example 1. The analysis results are shown in Table 1.

Comparative Example 4

(Polymerization Step 1) Synthesis of Polymer Block (A-9)

Polymerization was carried out using an autoclave with a capacity of 10 L and a stirrer and a jacket for heating and cooling. 4616 g of pure water, 206 g of disproportionated potassium rosinate (manufactured by Harima Chemicals Group, Inc.), 2.3 g of potassium hydroxide, 46.2 g of a sodium salt of β-naphthalene sulfonic acid formalin condensate (manufactured by Kao Corporation, product name: DEMOL N), 462 g of styrene monomer and 9.2 g of butylbenzyl trithiocarbonate were charged, the internal temperature was set to 80° C., and the mixture was stirred at 200 rpm under a nitrogen stream. By adding 6.0 g of 2,2'-azobis [2-(2-imidazolin-2-yl) propane] dihydrochloride (manufactured by FUJIFILM Wako Pure Chemical Corporation, product name: VA-044) as a polymerization initiator, polymerization was started. For the measurement of physical properties, 20 ml of the obtained latex was sampled, and the remaining latex was used in the polymerization step 2. The number average molecular weight, molecular weight distribution, and glass transition temperature of the polymer block (A-9) were determined by analysis in the same manner as in Example 1. The analysis results are shown in Table 1.

(Polymerization Step 2) Synthesis of Chloroprene-Based Polymer Block (B-9)

After the polymerization step 1, when the internal temperature dropped to 45° C., 4154 g of chloroprene monomer was slowly added over 2 hours to carry out the polymerization. When the polymerization rate of the chloroprene monomer reaches 80%, the polymerization was stopped by adding a 10% by weight aqueous solution of N, N-diethylhydroxylamine, which is a polymerization inhibitor, and the unreacted chloroprene monomer was removed by vacuum distillation. For the measurement of physical properties, 20 ml of the obtained latex was sampled, and the remaining latex was used to prepare a film for evaluation. The content (mass %) of the polymer block (A-9) and the chloroprene-based polymer block (B-9) in the chloroprene-based block copolymer and the toluene insoluble content were determined by analysis in the same manner as in Example 1. The analysis results are shown in Table 1.

Comparative Example 5

(Polymerization Step 1) Synthesis of Polymer Block (A-10)

Polymerization was carried out using an autoclave with a capacity of 10 L and a stirrer and a jacket for heating and cooling. 4616 g of pure water, 206 g of disproportionated potassium rosinate (manufactured by Harima Chemicals Group, Inc.), 2.3 g of potassium hydroxide, 46.2 g of a sodium salt of β-naphthalene sulfonic acid formalin condensate (manufactured by Kao Corporation, product name: DEMOL N), 692 g of styrene monomer and 9.2 g of butylbenzyl trithiocarbonate were charged, the internal temperature was set to 80° C., and the mixture was stirred at 200 rpm under a nitrogen stream. By adding 6.0 g of 2,2'-azobis [2-(2-imidazolin-2-yl) propane] dihydrochloride (manufactured by FUJIFILM Wako Pure Chemical Corporation, product name: VA-044) as a polymerization initiator, polymerization was started. For the measurement of physical properties, 20 ml of the obtained latex was sampled, and the remaining latex was used in the polymerization step 2. The number average molecular weight, molecular weight distribution, and glass transition temperature of the polymer block (A-10) were determined by analysis in the same manner as in Example 1. The analysis results are shown in Table 1.

(Polymerization Step 2) Synthesis of Chloroprene-Based Polymer Block (B-10)

After the polymerization step 1, when the internal temperature dropped to 45° C., 3924 g of chloroprene monomer was slowly added over 2 hours to carry out the polymerization. When the polymerization rate of the chloroprene monomer reaches 80%, the polymerization was stopped by adding a 10% by weight aqueous solution of N, N-diethylhydroxylamine, which is a polymerization inhibitor, and the unreacted chloroprene monomer was removed by vacuum distillation. For the measurement of physical properties, 20 ml of the obtained latex was sampled, and the remaining latex was used to prepare a film for evaluation. The content (mass %) of the polymer block (A-10) and the chloroprene-based polymer block (B-10) in the chloroprene-based block copolymer and the toluene insoluble content were determined by analysis in the same manner as in Example 1. The analysis results are shown in Table 1.

Comparative Example 6

Synthesis of Triblock Copolymer
(Synthesis of First Block)

Polymerization was carried out using an autoclave with a capacity of 10 L and a stirrer and a jacket for heating and cooling. 4613 g of pure water, 204.4 g of disproportionated potassium rosinate (manufactured by Harima Chemicals Group, Inc.), 2.3 g of potassium hydroxide, 46.1 g of a sodium salt of β-naphthalene sulfonic acid formalin condensate (manufactured by Kao Corporation, product name: DEMOL N), 230 g of styrene monomer and 9.2 g of benzyl1-pyrrolecarbodithioate were charged, the internal temperature was set to 80° C., and the mixture was stirred under a nitrogen stream at 200 rpm. By adding 6.0 g of 2,2'-azobis [2-(2-imidazolin-2-yl) propane] dihydrochloride (manufactured by FUJIFILM Wako Pure Chemical Corporation, product name: VA-044) as a polymerization initiator, polymerization was started. For the measurement of physical properties, 20 ml of the obtained latex was sampled, and the remaining latex was used in the next polymerization step. The number average molecular weight, molecular weight distribution, and glass transition temperature of the first block were determined by analysis in the same manner as in Example 1. The analysis results are shown in Table 2.

(Synthesis of Second Block)

After the synthesis of the first block, when the internal temperature dropped to 45° C., 4424 g of chloroprene monomer was added and polymerization was carried out. When the polymerization rate of the chloroprene monomer reaches 80%, the polymerization was stopped by adding a 10% by weight aqueous solution of N, N-diethylhydroxylamine, which is a polymerization inhibitor, and the unreacted chloroprene monomer was removed by vacuum distillation. The obtained latex was used in the next polymerization step.

(Synthesis of 3rd Block)

After the synthesis of the second block, the internal temperature was raised to 80° C., 230 g of styrene monomer was charged, and by adding 6.0 g of 2,2'-azobis [2-(2-imidazolin-2-yl) propane] dihydrochloride (manufactured by FUJIFILM Wako Pure Chemical Corporation, product name: VA-044) as a polymerization initiator, polymerization was started. After the polymerization was carried out, it was cooled to 25° C. to terminate the polymerization. For the measurement of physical properties, 20 ml of the obtained latex was sampled, and the remaining latex was used to prepare a film for evaluation. The contents (mass %) of styrene block, which is the first block and the third block, and chloroprene block, which is the second block, in the synthesized triblock copolymer and toluene insoluble content were determined by analysis in the same manner as in Example 1. The analysis results are shown in Table 2.

Comparative Example 7

Preparation of Mixture of Homopolymer of Polymer Block (A) and Homopolymer of chloroprene-based polymer block (B)
(Synthesis of Homopolymer of Polymer Block (A))

Polymerization was carried out using an autoclave with a capacity of 10 L and a stirrer and a jacket for heating and cooling. 4666 g of pure water, 224 g of disproportionated potassium rosinate (manufactured by Harima Chemicals Group, Inc.), 36.4 g of potassium hydroxide, 18.7 g of a sodium salt of β-naphthalene sulfonic acid formalin condensate (manufactured by Kao Corporation, product name: DEMOL N), 350 g of styrene monomer and 6.07 g of butylbenzyl trithiocarbonate were charged, the internal temperature was set to 80° C., and the mixture was stirred under a nitrogen stream at 200 rpm. By adding 3.82 g of 2,2'-azobis [2-(2-imidazolin-2-yl) propane] dihydrochloride (manufactured by FUJIFILM Wako Pure Chemical Corporation, product name: VA-044) as a polymerization initiator, polymerization was started. When the polymerization rate of the styrene monomer reached 95%, the polymerization was stopped by adding a 10% by weight aqueous solution of N, N-diethylhydroxylamine, which is a polymerization inhibitor. For the measurement of physical properties, 20 ml of the obtained latex was sampled. The number average molecular weight, molecular weight distribution, and glass transition temperature of the homopolymer of the polymer block (A) were determined by analysis in the same manner as in Example 1. The analysis results are shown in Table 3.
(Synthesis of Homopolymer of Chloroprene-Based Polymer Block (B))

Polymerization was carried out using an autoclave with a capacity of 10 L and a stirrer and a jacket for heating and cooling. 3960 g of pure water, 193 g of disproportionated potassium rosinate (manufactured by Harima Chemicals Group, Inc.), 31.2 g of potassium hydroxide, 17.6 g of a sodium salt of β-naphthalene sulfonic acid formalin condensate (manufactured by Kao Corporation, product name: DEMOL N), 4400 g of chloroprene monomer, 89.8 g of 1.9-nonanediol dimethacrylate, and 5.19 g of butylbenzyl-trithiocarbonate were charged, the internal temperature was set to 45° C., and the mixture was stirred at 200 rpm under a nitrogen stream. By adding 3.26 g of 2,2'-azobis [2-(2-imidazolin-2-yl) propane] dihydrochloride (manufactured by FUJIFILM Wako Pure Chemical Corporation, product name: VA-044) as a polymerization initiator, polymerization was started. When the polymerization rate of the chloroprene monomer reaches 80%, the polymerization was stopped by adding a 10% by weight aqueous solution of N, N-diethylhydroxylamine, which is a polymerization inhibitor, and the unreacted chloroprene monomer was removed by vacuum distillation.
(Mixing of Homopolymer Latex of Polymer Block (A) and Homopolymer Latex of Chloroprene-Based Polymer Block (B))

4000 g of the obtained latex of homopolymer of the polymer block (A) and 4000 g of the latex of the homopolymer of the chloroprene-based polymer block (B) were charged into an autoclave having a capacity of 10 L, a stirrer and a jacket for heating and cooling, and the internal temperature was adjusted to 45° C. and the mixture was stirred at 200 rpm. For the measurement of physical properties, 20 ml of the obtained latex was sampled, and the remaining latex was used to prepare a film for evaluation. The content (mass %) of the homopolymer of the polymer block (A) and the homopolymer of the chloroprene-based polymer block (B) and the toluene insoluble content in the mixed polymer were determined by analysis in the same manner as in Example 1. The analysis results are shown in Table 3.
[Analysis]
(Measurement of Number Average Molecular Weight and Molecular Weight Distribution of Polymer Block (A))

The number average molecular weight and the molecular weight distribution are polystyrene-equivalent values measured by gel permeation chromatography (GPC) and are measured values under the measurement conditions described below.
  Device: HLC-8320 (manufactured by Tosoh Corporation)
  Column: 3 TSKgel GMHHR-H in series
  Temperature: 40° C.
  Detection: differential refractometer
  Solvent: tetrahydrofuran
  Calibration curve: made using standard polystyrene (PS).
(Glass Transition Temperature of Polymer Block (A))

The glass transition temperature was measured by the following method using a differential scanning calorimeter in accordance with JIS K7121.
Devic: DSC1 (Mettler Toledo)
  Procedure: Under a nitrogen stream of 50 ml/min, the temperature was raised to 120° C. at a heating rate of 10° C./min, kept at 120° C. for 10 minutes, and then cooled to −60° C. Based on the DSC curve obtained by raising the temperature to 120° C. at a heating rate of 10° C./min, the temperature of the intersection of the straight line, extending the baseline on the high temperature side to the low temperature side, and the tangent line, drawn at the point where the gradient is maximum in the curve on the high temperature side of the peak was defined as the glass transition temperature.
(Measurement of Content of Polymer Block (A) and Chloroprene-Based Polymer Block (B) in Chloroprene-Based Block Copolymer)

Measurement was performed by the following method using a pyrolysis gas chromatogram and 1H-NMR.
Pyrolysis Gas Chromatogram
  Device: HP5890-II
  Column: DB-5 0.25 mmφ×30 m (film thickness 1.0 μm)
  Column temperature: 50° C. (5 min)→10° C./min→150° C.→25° C./min→300° C.
  Injection port temperature: 250° C.
  Detector temperature: 280° C.
Detector: FID
1H-NMR
  Device: JNM-ECX-400 (manufactured by JEOL Ltd.)
  Procedure: The chloroprene-based block copolymer comprising the polymer block (A) and the chloroprene-based polymer block (B) is analyzed by a pyrolysis gas chromatogram, a calibration line is obtained, based on the area ratio of a peak derived from the polymer block (A) and a peak derived from the chloroprene-based polymer block (B) and the contents of the polymer block (A) and the chloroprene-based polymer block (B) in the chloroprene-based block copolymer obtained by 1H-NMR measurement. A sample of the chloroprene-based block copolymer precipitated by mixing the sampled latex with methanol was measured by a pyrolysis gas chromatogram. From the area ratio of a peak derived from the polymer block (A) and a peak derived from the chloroprene-based polymer block (B), the contents of the polymer block (A) and the chloroprene-based polymer block (B) in the chloroprene-based block copolymer were determined using the calibration line prepared above.
[Preparation of Sample for Tensile Test]
(Preparation of Latex Containing Chloroprene-Based Block Copolymer)

2 parts by mass of a butylation reaction product of p-cresol and dicyclopentadiene (manufactured by OUCHI SHINKO CHEMICAL INDUSTRIAL CO., LTD, product name "Nocrak PBK") as an antiaging agent, 0.3 parts by mass of sodium lauryl sulfate (manufactured by Kao Corporation, product name "EMAL 10N") and water were added to 100 parts by mass (solid content equivalent) of the chloroprene-based block copolymer in the latex obtained in the polymerization step 2 so that the solid content concentration of the mixture is 30% by mass and the mixture was prepared by mixing at 20° C. for 16 hours using a ceramic ball mill.
(Making a Film)

A ceramic cylinder having an outer diameter of 50 mm was immersed in a coagulating solution containing 62 parts by mass of water, 35 parts by mass of potassium nitrate tetrahydrate, and 3 parts by mass of calcium carbonate for 1 second and taken out. After drying for 4 minutes, it was immersed in the latex prepared above for 2 minutes. Then, it was washed with running water at 45° C. for 1 minute and heated at 130° C. for 30 minutes to remove water, and a film for a tensile test (140×150 mm, thickness: 0.2 mm) was prepared.

[Evaluation of Tensile Properties]

The produced film was heat-treated at 130° C. for 30 minutes, and then the modulus at 500% elongation, the tensile strength at break, and the elongation at break were measured according to JIS K6251. When the modulus at 500% elongation was 3.0 MPa or less, the tensile strength at break was 17 MPa or more, and the elongation at break was 900% or more, it was regarded as an acceptable product.

[Measurement of Toluene Insoluble Content]

The latex obtained in the polymerization step 2 was freeze-dried, and 1 g of the obtained solid content obtained was cut into 2 mm squares. The squares were charged into a conical beaker and dissolved in toluene for 16 hours. Then, it was centrifuged, and further, the gel component was separated using a 200-mesh wire mesh, and the dried weight was measured to calculate the toluene insoluble content with the following formula.

(Weight of the solid obtained by separating and drying the gel component)/(Weight of the solid obtained by freeze-drying latex containing the chloroprene-based block copolymer)×100

TABLE 1

| | | | Example | | | | |
|---|---|---|---|---|---|---|---|
| | | | 1 | 2 | 3 | 4 | 5 |
| polymer block (A) | monomer unit | — | styrene | styrene | styrene | styrene | methyl methacrylate |
| | number average molecular weight | g/mol | 15,157 | 14,988 | 15,182 | 19,622 | 20,315 |
| | molecular weight distribution | — | 1.18 | 1.20 | 1.17 | 1.16 | 1.24 |
| | glass transition temperature | ° C. | 90 | 92 | 90 | 96 | 107 |
| content of polymer block (A) and chloroprene-based polymer block (B) in chloroprene-based block copolymer | polymer block (A) | type | A-1 | A-2 | A-3 | A-4 | A-5 |
| | | mass % | 8.9 | 5.3 | 14.8 | 28.2 | 8.9 |
| | chloroprene-based polymer block (B) | type | B-1 | B-2 | B-3 | B-4 | B-5 |
| | | mass % | 91.1 | 94.7 | 85.2 | 71.8 | 91.1 |
| toluene insoluble content | | mass % | 26.8 | 22.3 | 39.6 | 44.0 | 29.2 |
| tensile property | modulus at 500% elongation | MPa | 1.3 | 0.9 | 1.9 | 2.7 | 2.1 |
| | tensile strength at brake | MPa | 18 | 17 | 22 | 25 | 21 |
| | elongation at break | % | 965 | 981 | 921 | 904 | 901 |

| | | | Comparative Example | | | | |
|---|---|---|---|---|---|---|---|
| | | | 1 | 2 | 3 | 4 | 5 |
| polymer block (A) | monomer unit | — | styrene | styrene | — | styrene | styrene |
| | number average molecular weight | g/mol | 15,011 | 29,876 | — | 14,104 | 19,003 |
| | molecular weight distribution | — | 1.17 | 1.26 | — | 1.26 | 1.24 |
| | glass transition temperature | ° C. | 89 | 103 | — | 90 | 95 |
| content of polymer block (A) and chloroprene-based polymer block (B) in chloroprene-based block copolymer | polymer block (A) | type | A-6 | A-7 | — | A-9 | A-10 |
| | | mass % | 3.8 | 32.3 | — | 12.2 | 18.0 |
| | chloroprene-based polymer block (B) | type | B-6 | B-7 | B-8 | B-9 | B-10 |
| | | mass % | 96.2 | 67.7 | 100.0 | 87.8 | 82.0 |
| toluene insoluble content | | mass % | 20.1 | 56.7 | 17.4 | 10.1 | 12.6 |
| tensile property | modulus at 500% elongation | MPa | 0.7 | 3.1 | 0.4 | 1.4 | 2.0 |
| | tensile strength at brake | MPa | 12 | 27 | 5 | 11 | 13 |
| | elongation at break | % | 1085 | 894 | 1362 | 1221 | 1152 |

TABLE 2

| | | | Comparative Example 6 |
|---|---|---|---|
| first block | monomer unit | — | styrene |
| | number average molecular weight | g/mol | 7,449 |
| | molecular weight distribution | — | 1.17 |
| | glass transition temperature | ° C. | 88 |
| content of first, third block (styrene block) and second block (chloroprene block) in triblock copolymer | first, third block (styrene block) | mass % | 12.2 |
| | second block (chloroprene-based polymer block) | mass % | 87.8 |
| toluene insoluble content | | mass % | 5.8 |
| tensile property | modulus at 500% elongation | MPa | 2.4 |
| | tensile strength at brake | MPa | 15 |
| | elongation at break | % | 1024 |

TABLE 3

|  |  |  | Comparative Example 7 |
|---|---|---|---|
| homopolymer of polymer block (A) | monomer unit | — | styrene |
|  | number average molecular weight | g/mol | 14,821 |
|  | molecular weight distribution | — | 1.18 |
|  | glass transition temperature | °C. | 89 |
| content of homopolymer of polymer block (A) | homopolymer of polymer block (A) | mass % | 9.1 |
| homopolymer of chloroprene polymer block (B) in the polymer obtained by mixing and | homopolymer of chloroprene-based polymer block (B) | mass % | 90.9 |
| toluene insoluble content |  | mass % | 3.2 |
| tensile property | modulus at 500% elongation | MPa | 1.4 |
|  | tensile strength at brake | MPa | 14 |
|  | elongation at break | % | 1145 |

In Examples 1 to 5, even if a vulcanizing agent or a vulcanizing accelerator is not used, the modulus at 500% elongation is 3.0 MPa or less and excellent in flexibility, the tensile strength at break is 17 MPa or more, and the elongation at break was 900% or more, and the tensile properties were excellent. On the other hand, in Comparative Examples 1 to 7, any of the physical properties of flexibility and tensile property was inferior.

The invention claimed is:

1. A chloroprene-based block copolymer, comprising 5 to 30% by mass of a polymer block (A) and 70 to 95% by mass of a chloroprene-based polymer block (B), wherein:
   the polymer block (A) is derived from a monomer;
   when the monomer is polymerized alone, a polymer with a glass transition temperature of 80° C. or higher can be obtained;
   the chloroprene-based polymer block (B) includes a chloroprene monomer; and
   the chloroprene-based block copolymer has a toluene insoluble content of 20 to 100% by mass with respect to 100% by mass of the chloroprene-based block copolymer.

2. The chloroprene-based block copolymer of claim 1, comprising 5 to 15% by mass of the polymer block (A) and 85 to 95% by mass of the chloroprene-based polymer block (B) in 100% by mass of the chloroprene-based block copolymer.

3. The chloroprene-based block copolymer of claim 1, wherein a tensile strength at break measured in accordance with JIS K6251 of a molded body of a latex composition containing the chloroprene-based block copolymer after heat treatment at 130° C. for 30 minutes is 17 MPa or more.

4. The chloroprene-based block copolymer of claim 1, wherein the polymer block (A) has a number average molecular weight of 10,000 or more.

5. The chloroprene-based block copolymer of claim 1, wherein a molecular weight distribution of the polymer block (A) is 2.0 or less.

6. The chloroprene-based block copolymer of claim 1, wherein the polymer block (A) is a polymer block comprising an aromatic vinyl monomer unit.

7. The chloroprene-based block copolymer of claim 1, wherein:
   the chloroprene-based block copolymer has a functional group of a structure represented by formula (1) or formula (2), and

(1)

in formula (1), $R^1$ represents hydrogen, chlorine, substituted or unsubstituted alkyl group, substituted or unsubstituted alkenyl group, substituted or unsubstituted aryl group, or substituted or unsubstituted heterocyclyl group

(2)

8. A latex comprising the chloroprene-based block copolymer of claim 1.

9. A latex composition, comprising 100 parts by mass of the latex of claim 8 and 0.5 to 5.0 parts by mass of an antioxidant.

10. The latex composition of claim 9, comprising neither a vulcanizing agent nor a vulcanizing accelerator.

11. The rubber composition, comprising the chloroprene-based block copolymer of claim 1.

12. The rubber composition, comprising the latex of claim 8.

13. The rubber composition, comprising the latex composition of claim 9.

* * * * *